Dec. 14, 1926.  
C. GRAF  
1,610,514  
PROJECTION LENS  
Filed April 25, 1925

INVENTOR.  
C. Graf.  
BY M. K. Saunders  
ATTORNEYS.

Patented Dec. 14, 1926.

1,610,514

UNITED STATES PATENT OFFICE.

CHRISTOPHER GRAF, OF SOUTH BEND, INDIANA.

PROJECTION LENS.

Application filed April 25, 1925. Serial No. 25,865.

This invention relates to projection lenses for use in kinematographic projection apparatus and the object of my invention is to provide a projection lens for such purpose having high light collecting and light transmitting properties.

Another object of my invention is to provide such a projection lens in which there are no delicately adjusted air spaces between the elements of the lens combination.

Another object of my invention is to provide such a projection lens having a short back focus whereby the lens can be set closer to the film and gate so that substantially all of the light passing through the film will be entrained and transmitted.

I accomplish the above and other objects of my invention, which will be apparent as the description proceeds, by means of the construction shown in the accompanying drawings, in which—

Figure 1:
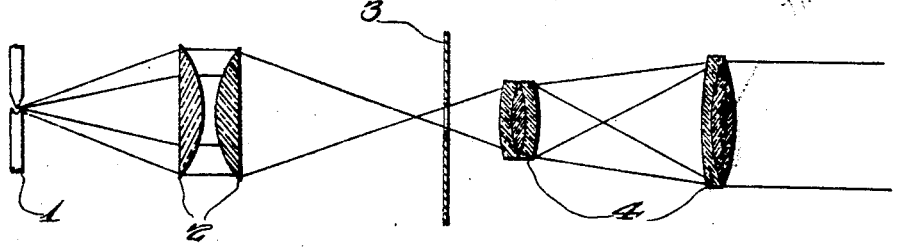
Figure 2:
Figure 2:
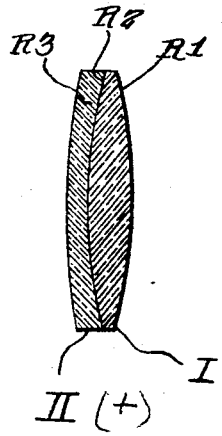
Figure 3:
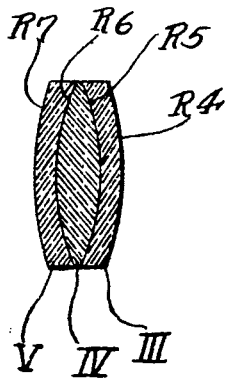
Figure 3:
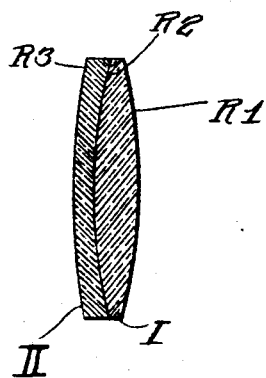

Figure 1 is a diagrammatic view of a projection system embodying my improved projection lens, and Figures 2 and 3 are diagrammatic views of two forms of my improved projection lens.

In the drawing 1 indicates the source of light, 2 the condenser lens, 3 the film and gate and 4 the projection lens elements, all of which except the last named lens elements may be of the usual type employed in projection apparatus.

The projection lens elements, shown in Figures 2 and 3, constituting two forms of the present invention, are composed of front and rear lens components. The rear component is shown in Fig. 2 as an achromatic collecting lens comprised of a negative convexo-concave lens element IV cemented to a bi-convex lens element III or, as shown in Fig. 3, a triple cemented combination consisting of two negative convexo-concave elements III and V and a bi-convex element IV, while the front lens component, as shown in both of Figures 2 and 3 is comprised of a negative convexo-concave lens element II cemented to a bi-convex lens element I.

Most projection lenses that have heretofore been proposed are of the Petzval type. They embody a cemented front combination and a pair of complemental rear lens elements that are separated by an air space. This type of lens has six free surfaces, thus losing much light through reflection and also making cleaning and assembling difficult. The most serious disadvantage of the Petzval type of lens is that the back focus is generally more than 50% of the equivalent focus. Furthermore, this back focus changes in direct proportion to changes in equivalent focal length, becoming greater or less as the focal length of the lens is increased or decreased. Therefore, a lens system having a long equivalent focus for a long projection necessitates a long back focus and the transmitted light is correspondingly decreased. All lens systems whose back focus increases as the effective focus is increased thus become less efficient as greater efficiency is required. The disadvantage of this is obvious since more light is needed for a long projection than for a short projection.

As is well known, an efficient projection lens should be located as close as possible to the film or gate in order that all the light passing through the film shall be received on the rear lens component. This is necessary for the reason that in a projection system the condenser focuses the light on the film, the light spreading out from this focus, after transmission through the film, in the form of a cone; therefore, the back lens component of the projection lens should be so located that its area will be equal to the cross section of the cone of light at this point so that all of the light will be entrained and caused to pass through the projection lens.

Light received on the film is also diffused and dispersed thereby and it is advantageous that as many as possible of the diffused and divergent rays should be received and projected by the projection lens. Repeated experiments, taking into consideration these facts, show that the most suitable distance from the film to the rear component of the projection lens for the projection of a standard film is approximately one and one-half inches for lenses of the most popular focal lengths. For the sixteen-millimeter film, the most satisfactory distance between the film and the rear component of the projection lens is three-quarters of an inch.

A lens constructed in accordance with my invention has light collecting and projecting qualities that are far superior to anything heretofore proposed. It has been found by repeated tests that this lens, in all focal lengths, collects and transmits to the screen at least 50% more light than the older type of available projection lens. Images produced by the lens have superior delineation and more even illumination over the entire screen.

Mechanically, the lens embodies single unitary front and rear elements thereby avoiding the necessity for delicate separation adjustments; moreover there are only four surfaces which require cleaning.

The back focus of the projection lens is conveniently short and the distance between the front and rear components is approximately equal to the equivalent focus of the combination. It is thus possible to construct a projection lens in accordance with my invention in any desired focal length and in which the rear component is sufficiently near to the end of the lens barrel to provide convenient cleaning property. The barrel of the lens and the lens elements are so related that the construction entrains and transmits substantially all of the light that falls upon the rear lens combination.

The back focus of the lens system in the first example hereinafter set forth is substantially two inches, although a much shorter or longer back focus may be employed within the scope of my invention, the back focus of the system being varied by varying the focal length of the front combination. It is thus possible to so locate the projection lens with respect to the film that practically all of the light passing through the film will fall upon the rear component of the lens thereby avoiding loss of light through divergence or diffusion.

For a projection lens system of the construction given in the first example, a back focus of two inches appears to be desirable for two reasons, first, too great dispersion of the light passing through the film starts at two inches therefrom, and second, this distance provides ample clearance for the necessary parts of the projection apparatus. In making the necessary calculations, consideration was given to the accepted theory that illuminating intensity is in inverse proportion to the distance from the apparent source of light.

In the examples given hereinafter the following conventional nomenclature is employed:

B, back focus of system.
F, equivalent focus.
$f^1$, focal length of front lens combination.
$f^2$, focal length of rear lens combination.
S, distance between front and rear combinations.
R, radius of curvature.
D, index of refraction for D line.
V, dispersive reciprocal.

The equivalent focus is determined by the following formula $$F \text{ equals } \frac{f^1 f^2}{f^1 \text{ plus } f^2 \text{ minus } S}$$

Many different examples could be given the application of the principles of my invention to various types of lens systems adapted for use in many kinds of optical machines. The following examples, however, are selected as typical of my invention and may be employed in a great variety of optical apparatus.

*Example I. (Fig. 2).*

|  | D. | V. |
|---|---|---|
| Lenses I and IV | 1.51012 | 63.3 crown. |
| Lenses II and III | 1.6202 | 36.02 dense flint. |
| $R^1$ 130.93 | Lens thickness. | Lens diameter. |
| $R^2$ 119.6 | I 9.5 | 64 |
| $R^3$+1800. | II 3.5 | 64 |
| $R^4$ 76.03 | III 10.5 | 50 |
| $R^5$ 66.10 | IV 2.5 | 50 |
| $R^6$+1800. | | |
| S 8 inches. | | |
| $f^1$ 12 inches. | | |
| $f^2$ 8 inches. | | |
| B 2 inches. | | |
| F 8 inches. | | |

*Example II (Fig. 3).*

|  | D. | V. |
|---|---|---|
| Lenses I and IV | 1.51012 | 63.3 crown. |
| Lenses II, III and V | 1.6202 | 36.02 flint. |
| $R^1$ 130.93 | Lens thickness. | Lens diameter. |
| $R^2$ 119.60 | I 7.15 | 64 |
| $R^3$ 1800. | II 2.60 | 64 |
| $R^4$ 163.76 | III 2.50 | 50 |
| $R^5$ 81.88 | IV 11.00 | 50 |
| $R^6$ 81.88 | V 2.50 | 50 |
| $R^7$ 163.76 | | |
| S 8 inches. | | |
| $f^1$ 12 inches. | | |
| $f^2$ 8 inches. | | |
| B 2 inches. | | |
| F 8 inches. | | |

Lens for use with new 16 millimeter film.

*Example III (Fig. 3).*

|  | D. | V. |
|---|---|---|
| Lenses I and III | 1.5102 | 63.7 |
| Lenses II and IV | 1.6202 | 36.02 |
| $R^1$ 35.12 | | |
| $R^2$ 31.60 | | |
| $R^3$+726. | | |
| $R^4$ 30.12 | | |
| $R^5$ 17.91 | | |
| $R^6$+478.35 | | |
| S 2 inches | Lens thickness. | Lens diameter. |
| $f^1$ 3 inches | I 4.5 | 22 |
| $f^2$ 2 inches | II 1.5 | 22 |
| B ½ inch | III 7.5 | 22 |
| F 2 inches | IV 1.5 | |

From the above examples it is only a matter of computation to construct other lens components in accordance with this invention, having first determined upon a suitable back focus. For this reason, lenses constructed in accordance herewith have a controlled back focus or, in other words, assuming any convenient back focus in keeping with mechanical clearances, a lens system can be calculated readily having that back focus.

In order to give a complete idea of the scope of the application of this invention to various other lens systems, the following data are given for numerous other systems.

| B | ½ | ½ | ½ | ½ | ¾ | ¾ | ¾ | ¾ | 1 | 1 | 1 | 1 | 1½ | 1½ |
|---|---|---|---|---|---|---|---|---|---|---|---|---|---|---|
| F | 1½ | 2 | 2½ | 3 | 1½ | 2 | 2½ | 3 | 1½ | 2 | 2½ | 3 | 5 | 6 |
| $f^1$ | 2½ | 3 | 3½ | 4 | 3 | 3½ | 4 | 4½ | 3½ | 4 | 4½ | 5 | 8 | 9 |
| $f^2$ | 1½ | 2 | 2½ | 3 | 1½ | 2 | 2½ | 3 | 1½ | 2 | 2½ | 3 | 5 | 6 |
| S | 1½ | 2 | 2½ | 3 | 1½ | 2 | 2½ | 3 | 1½ | 2 | 2½ | 3 | 5 | 6 |

Particular attention is directed to the relation of the focal lengths of the front and the rear lens components of these optical systems. Ordinarily, the focus of the rear component is greater than the focal length of the front combination. This relation is reversed in my improved projection lens and the rear component has the shorter focal length. The separation of the front and rear components is also a distinguishing feature and remains substantially equal to the equivalent focal length of the lens system. These relations are conveniently illustrated by the formula: F equals S equals $f^2$.

Calculations show that in an objective where the equivalent focus, the focal length of the rear lens elements and the separation between the front and rear lens elements are equal, the required back focus multiplied by two and added to the focal length of the back lens gives the required focus of the front lens. Or, in an objective whose equivalent focus, focal length of the rear lens element and separation of the front and rear lens elements are equal, the sum of the required desired back focus multiplied by two plus the focal length of the back lens element equals the focal length of the front lens element $f^1$ equals B times 2 plus $f^2$ or, as stated previously $$F \text{ equals } \frac{f^1 f^2}{f^1 \text{ plus } f^2 \text{ minus } S}$$

By means of the first formula developed, projection lenses of all focal lengths can be made with a given selected back focus which will most efficiently collect the spreading rays after transmission through the film. Where the mechanical parts of the projection apparatus prevent the most efficient back focus, the back focus can be controlled to fit the projector so that the lens will be as efficient as possible with the particular projector employed.

It is to be understood that the forms shown on the drawing are merely illustrative of preferred forms of the invention, since other lens components comprising different forms of lenses are within the scope of my invention.

Having thus fully described my invention, what I claim as new and desire to secure by Letters Patent is:

1. A projection lens system comprising a front lens component and a rear lens component, the focal length of the front component being approximately equal to the focal length of the system plus twice the back focus of the system.

2. A projection lens system comprising a front lens component and a rear lens component, the focal length of the front component being approximately equal to the focal length of the rear component plus twice the back focus of the system.

3. A projection lens system comprising a front lens component and a rear lens component, the focal length of the front component being approximately twice the back focus of the system plus the focal length of the rear component, and the equivalent focus of the system being approximately equal to the focal length of the rear component.

4. A projection lens system comprising a front lens component and a rear lens component, the focal length of the front component being approximately twice the back focus of the system plus the focal length of the rear component, and the equivalent focus of the system, the focal length of the rear component, and the separation between said components being approximately equal.

5. A projection lens system comprising a front lens component and a rear lens component, the rear lens component including a positive and a negative lens, the focal length of the front component being twice the back focus of the system plus the focal length of the rear component, and the equivalent focus of the system being equal to the focal length of the rear component.

6. A projection lens system comprising a front lens component and a rear lens component, each of said components including a negative and a positive lens, the focal length of the front component being twice the back focus of the system plus the focal length of the rear component, and the equivalent focus of the system, the focal length of the rear component, and the separation between said components being equal.

7. A combination of lenses having a predetermined back focus, said combination comprising a front lens and a rear lens, the focal length of the rear lens being equal to the equivalent focus of the system and less than the focal length of the front lens, the difference in said focal lengths being twice the back focus of the combination, whereby a projection system of short back focus may be produced having any desired equivalent focus.

In testimony whereof I affix my signature.

CHRISTOPHER GRAF.